April 20, 1965 K. S. NORRIS ETAL 3,179,084
AQUARIUM
Filed Jan. 5, 1962
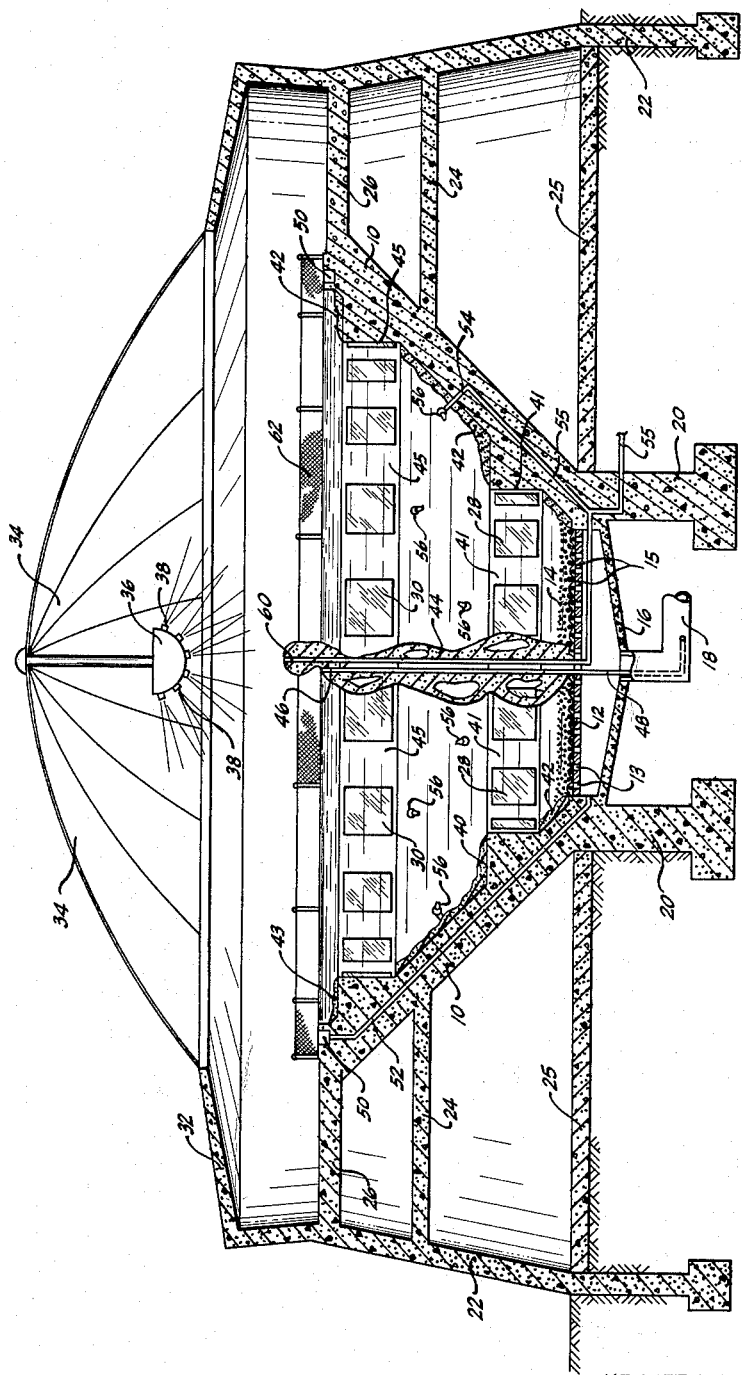
INVENTORS
KENNETH S. NORRIS
WILLIAM N. McFARLAND
BY
AGENT

United States Patent Office 3,179,084
Patented Apr. 20, 1965

3,179,084
AQUARIUM
Kenneth S. Norris, 5 Fruit Tree Road, Portuguese Bend, Calif., and William N. McFarland, 143 Graham Road, Ithaca, N.Y.
Filed Jan. 5, 1962, Ser. No. 164,531
20 Claims. (Cl. 119—5)

This invention relates generally to the care of captive aquatic animals, and in particular to an improved aquarium especially adapted to the convenient maintenance and display of aquatic flora and fauna.

Aquariums for the exhibition of aquatic animals have been available to the public for many years. However, prior art aquariums all possess a number of common drawbacks which seriously interfere with providing an optimum presentation of marine flora and fauna with a minimum of care. A public aquarium or oceanarium ideally provides the observer with the illusion that he is immersed in the aquatic environment. However, considerations such as the health of plants and animals on display and the maintenance of large population aquatic animal displays has previously necessitated compromise with the potential beauty and illusion of the display.

All of the large aquatic animal community displays found in public aquariums are housed in conventional vortex tanks, i.e., a vertical wall tank having a circular water flow pattern and having occasional windows located at different heights in the wall. The vertical walls of these vortex tanks are difficult to decorate and, even at best, fail to provide a realistic aquatic environment. Another serious disadvantage of the vortex aquarium is that the vertical walls are hazardous to pelagic (open sea) species of fish which inherently run into vertical obstructions in a confined area where there is no shallowing or loss of water depth as a warning. The vertical walls of vortex tanks are also disadvantageous to the care and display of demersal (bottom or shore) species of fish because none of the necessary protective refuge is provided except at the very bottom of the tank. As a result, the conventional vertical wall display tank inherently restricts demersal varieties to the bare sloped bottom of a vortex tank, thus greatly reducing the observability of the demersal species as well as providing only a minimum survival environment.

Water is conventionally introduced into the vertical wall vortex aquarium so as to produce a circular motion of the entire body of water in the tank, thus creating an identifying vortex. This requirement of producing a circular flow pattern in the water in the vortex tank, primarily for preventing water stagnation and promoting the creeping of debris toward the center drain outlet, prevents adequate decoration of the tank since decorative objects interrupt the flow pattern within the tank. Also, since the circular or rotating water flow in typical vortex tanks necessitates a relatively unobstructed container, the overall aquarium is limited to either a circular or ovoid shape. This lack of architectural flexibility with the vertical wall vortex tank is a serious disadvantage when designing to provide the most esthetically pleasing aquatic environment for a natural marine life display. A still further disadvantage of producing a circular flow pattern in the vertical wall vortex tank relates to the manner in which the water surface spins, thus forcing floating material toward the tank center. Scums that are lighter than water, created by fish mucus, oily food stuffs, and the like, float to the surface and either spin at the center of the aquarium water surface or coat the tank wall at the water surface where they are unattractive and difficult to remove.

Waste materials heavier than water collect in the bottom sand of the vortex tank and are continually kicked back into suspension by the fish, divers, etc. Since the bottom must be sloped in the conventional vortex tank to allow debris to migrate toward the small center drain outlet, sand and accumulated wastes on the sloping bottom move toward the center and collect in piles at the tank center leaving large areas of the tank bottom exposed. Fish tend to scrape on any exposed tank bottom surface creating skin abrasions and sores on their bodies. Also, since in conventional vortex tanks water does not flow through the bottom sand, a trap is created for these heavy waste materials which encourages a high level of biological activity in the bottom sand with a concomitant change in water acidity in these stagnant sand-water zones. As is well known, sand "rots" or becomes anaerobic quite readily in high acid environments with a resulting production of hydrogen sulfide, thus contributing markedly to the dirtiness of aquariums.

It is accordingly an object of this invention to provide an improved aquarium which is particularly suitable for maintaining aquatic animals for exhibition.

Another object of this invention is to provide an improved aquarium particularly suitable for displaying both demersal and pelagic fish species.

A further object of this invention is to provide an improved aquarium which is easily cleaned, readily decorated, and whose side and bottom surfaces retain a minimum of the colloidal refuse material which is detrimental to water clarity and aquarium hygiene.

A still further object of this invention is to provide an improved aquarium which eliminates sand "rotting" and which minimizes aggregate movement or creeping on the tank bottom.

Another object of this invention is to provide an improved aquarium whose water circulation does not depend on the conventional rotary or vortex fluid flow, thus permitting the installation of large decorative and/or functional objects throughout the tank space without any loss of water freshness or clarity.

A further object of this invention is to provide an improved aquarium whose only restriction on the geometric configuration of the tank space is that the tank has sloped walls and a flat bottom.

A further object of this invention is to provide an improved aquarium for the captive care of pelagic fish species which inherently guides the pelagic species to the center of the tank space.

A still further object of this invention is to provide an improved aquarium wherein there is a minimum of ulcer formation among the aquatic animal inhabitants, particularly the demersal or bottom fish.

Another object of this invention is to provide an improved aquarium wherein the formation of debris and dirt coatings on the tank walls is minimized, and wherein scum, film, and foam on the water surface is substantially eliminated.

A further object is to provide an improved aquarium which can be readily built on a slope or other irregular terrain with a minimum of excavation and which is comparatively economical yet structurally sound and attractive in appearance.

A still further object of this invention is to provide an improved aquarium wherein a much better display of all types of aquatic animals can be obtained with a smaller volume of water than is possible with conventional vortex tanks.

Another object of this invention is to provide an improved aquarium wherein the water introduction system provides an easily controllable distribution throughout the tank of certain fish species sensitive to water velocity.

A still further object of this invention is to provide an improved aquarium having a fluid inlet system adapted to the precision feeding of foods, chemicals, medicines, and the like in localized areas of need.

A further object of this invention is to provide an improved aquarium wherein there is optimum light control which provides a mechanism for checking algae growth and for improving observer visibility by reducing light scattering (Tyndal effect).

Another object of this invention is to provide an improved aquarium wherein cross-tank vision is minimized thus reducing the distraction of the observer from the natural marine environment illusion.

Other objects and advantages of this invention will become apparent to those skilled in the art as the description and illustration thereof proceed.

We have now found that the foregoing objects and their attendant advantages can be particularly realized in an aquarium comprising a tank having sides generally sloping inwardly from the tank top towards the tank center with windows in the sloping tank sides, and having a relatively flat horizontal porous bottom. Water is introduced at multiple points throughout the tank, usually in a substantially random fashion. Water is removed from the aquarium through the entire porous bottom creating a general downward movement of water and, preferably, a minor amount of water is also removed at the water surface via an overflow gutter located at the tank rim, and optionally, via a centrally located gutter at the aquarium's water surface.

The improved aquarium of our invention can best be understood with reference to the accompanying drawing, which forms a part of this application, and the subsequent description thereof.

The drawing is a view in cross-section of one embodiment of the apparatus of this invention comprising a circular aquarium with a removable dome ceiling.

It is to be understood that the improved aquarium of this invention is broadly applicable to the maintenance and display of fresh and salt water fauna and flora. Thus, although the aquarium and aquatic animal care techniques are specifically described herein in connection with a marine (salt water) environment, our aquarium can also be used in the exhibition of fresh water flora and fauna.

Referring now more particularly to the drawing, the aquarium of the present invention is described in terms of a specific embodiment used in the care of demersal and pelagic species of salt water animals. The dish, bowl, or cup shaped aquarium shown in the drawing is filled with ocean water and a multiplicity of fish, and comprises sloped wall 10 which slopes gently outward and upward from flat porous tank bottom 12. Sloped wall 10 can be made of any suitable structural material such as metal, plastic, wood, and the like, or reinforced concrete as shown here. The incline of sloped wall 10 represents a compromise between total tank area, tank depth, and the desired angle of sloped wall 10. Preferably, sloped wall 10 is inclined at an angle not greater than about 45 degrees from horizontal as the beneficial effects of the sloped walls, e.g., warning pelagic fish species of vertical obstructions and ease of decoration, are lost sharply as the angle increases appreciably over 45 degrees. However, although angles of between about 35 degrees and about 55 degrees for sloped wall 10 are preferred, sloped wall 10 can be inclined at any angle which provides the necessary warning or sounding effects for pelagic fish species and creates an easily decorated sloped surface.

The vertical walls of the typical vortex tank are virtually impossible to decorate, thus presenting an unattractive appearance to observers, particularly when viewed from the opposite side of the tank. In contrast, sloped wall 10 and window ledges 40 and 43 can be attractively decorated with comparative ease. A sprayed concrete or gunite coating 42, providing decorative flexibility as to form and texture, can be used as shown here to cover the entire interior aquarium wall area, i.e., the surfaces of sloped wall 10 and window frame ledges 40 and 43. Thus, looking into the aquarium from tank windows 28 or 30, an observer sees not only water and the swimming animal inhabitants, but an observer is also able to gaze down decorated slopes which are alive with all of the flora and fauna typical to ocean bottom zones. Since sloped wall 10 serves as a perch or resting place for demersal fishes, the bottom fish are drawn up the aquarium sides and are visible from all of windows 28 and 30 as well as from the top of the aquarium through the water surface. In covering the interior aquarium wall surfaces with gunite coating 42, a downward slope should be maintained to facilitate particle movement downward to the bottom, and, particularly, debris collecting pockets in coating 42 should be avoided.

Horizontal tank bottom 12 comprises a foraminous plate structure, herein illustrated as a heavy metal grating having a multiplicity of regularly spaced openings 13. Tank bottom 12 can be constructed of any suitable corrosion resistant material, and preferably is made of plastic, plastic coated metal, stainless steel, aluminum, concrete, or the like. Openings 13 are large enough to allow a free flow of water through tank bottom 12, but small enough to support plastic screen 15 which has a mesh size opening small enough to retain the substantially uniformly sized aggregate in bed 14. Screen 15 can be made of any suitable mesh material including woven metal, plastics, plastic coated wire, and the like. Also, when appropriate, screen 15 can be omitted in which case aggregate bed 14 rests directly on tank bottom 12 and openings 13 are smaller in diameter than the aggregate. On top of plastic screen 15 covering openings 13 in tank bottom 12 is substantially horizontal aggregate bed 14 comprising a layer of uniformly sized gravel. This aggregate bed 14 usually comprises pebbles, rocks, gravel, or the like which is resistant to salt water attack. The preferred aggregate is a smooth pebble bed made up, preferably, of pebbles having a mean diameter between about ⅛ inch and about ½ inch. However, aggregate bed 14 can comprise particles having a mean diameter as small as 1/16 inch or smaller, or can comprise uniformly sized boulders up to several inches or larger in mean diameter. The uniformly sized aggregate layer of aggregate bed 14 provides a porous bed through which food, fish excrement, and other wastes pass while providing a yielding aquarium bottom surface particularly suited for aquatic animal contact. This clean gravel or pebble bottom substantially inhibits the development of ulcers induced when fish constantly scrape themselves on the conventional cement or metal tank floors. The gravel bottom is easily raked and smoothed by divers, and the raking also aids in working clinging debris through aggregate bed 14.

Of course, any porous construction is suitable for the tank bottom of our aquarium as long as the bottom is relatively horizontal and the porosity is such that wastes and excess food are able to pass readily through the bottom into the water discharge system without any substantial loss of aggregate. Since, in the dished tank aquarium of our invention, substantially the entire horizontal bottom area of the tank acts as a water outlet, bottom aggregate materials do not migrate toward the center as in conventional vortex tanks with sloped bottoms. Instead, dirty water moves evenly into and through the porous tank bottom without any displacement of tank aggregate layer 14. Aggregate bed 14, positioned in an even layer over porous tank bottom 12, has a substantially uniform flow of cleansing or flushing water passing downwardly through the aggregate at all times. This constant flushing of aggregate bed 14 prevents static zones from being created in the interstitial spaces between the sand and other aggregate particles, thus inhibiting acid formation in the aggregate layers.

The area of porous tank bottom 12 of our aquarium, related to tank volume and water flushing rates, varies widely according to the diameter of the tank top, the height of the tank, and the slope of the walls. In a preferred embodiment of our invention tank bottom 12 has an area equal to at least about 4 percent, and more preferably at least about 10 percent, of the top water surface area of the tank. Usually, for a natural presentation and optimum flow pattern, it is preferred that porous tank bottom 12 have an area between about 15 and about 30 percent of the top water surface area of the aquarium.

A particularly advantageous feature of our invention is the technique of introducing water into the aquarium. Water inlet conduits 54, manifolded from a common water supply line 55, project from sloped wall 10 and terminate in adjustable water inlet nozzles 56 which have a connecting joint similar to the type commonly found on bathroom shower fixtures. Such flexible ball joints are common and well known to those skilled in the art; a suitable joint is manufactured by The Barnes Manufacturing Co. and is described in their Catalog No. 215B, Flexible Ball Joints, 1956. Water inlet nozzles 56 are movable through about 180 degrees in a plane perpendicular to sloped wall 10 and through about 360 degrees in a plane parallel to sloped wall 10. Thus, multiple water inlet conduits 54 provide essentially complete flexibility within the tank as to water flow direction. Since some fish species frequent high velocity water zones and other species prefer low velocity water zones, it is possible to concentrate certain species of fish about water inlet nozzles 56 and others away from water inlet nozzles 56. Displays near windows 28 and 30 can thus be controlled and the specific fish varieties attracted by the presence or absence of high water velocities. In addition, since some corals need rapid flushing rates, they can be placed in areas of high water velocities near water inlet nozzles 56 where they can proliferate and maintain themselves in a manner which is impossible in the substantially static bottom zones of the conventional vortex tank.

Although the water can be directed in any direction from adjustable water inlet nozzles 56 of water inlet conduits 54, it is preferred that a large portion of the flow be directed downward towards aggregate bed 14 resting on porous tank bottom 12. This assists in the movement of particles suspended in the water toward, and then through, aggregate bed 14 where particles are flushed through the porous plate of tank bottom 12 into conical collecting basin 16 and thus into tank discharge 18. The presence in the aquarium of a multiplicity of manifolded water inlet conduits 54 around which corals and other such organisms can be grouped, e.g., tropical plants, allows localized feeding for individual fish and plant varieties without dirtying the entire tank with fertilizers, plankton, and the like. A conventional injection or chemical feed pump (not shown) can be connected to each water inlet conduit 54. Since the chemicals are injected into the individual water conduits 54, rather than the common water supply line 55, this construction permits individual feeding of chemicals, food, etc., via each water inlet nozzle 56. Water inlet conduits 54 are usually conduits or pipes made of any corrosion resistant material which is structurally suitable. A preferred material of construction for these water inlet pipes is a thermoplastic tubing, e.g., Uscolite (U.S. Rubber Company), which is completely non-toxic and does not corrode in a salt water environment. A convenient method of installation is to locate water inlet conduits 54 on sloped wall 10 of the tank structure, then covering these water inlet conduits 54 with the decorative layer of gunite coating 42 with only a short portion of water inlet conduits 54 exposed with swivel-joint or universal joint water inlet nozzles 56 attached.

Beneath tank bottom 12 is conical collecting basin 16 whose cone-shaped structure connects at its apex to tank discharge line 18. Discharge line 18 can either be connected to the sewer, as here, or line 18 can carry water from the aquarium to a treatment plant which reconditions the used, dirty water for recirculation. When the aquarium is near the ocean, or near a fresh water supply such as a river or lake, raw water is preferably used as a water supply with no recirculation of used water. However, in areas where an ample supply of raw water is not readily available, treatment and recirculation is completely satisfactory. A typical water volume for an aquarium of our invention is between about 150,000 and 500,000 gallons, depending on tank diameter, on window size, on the volume of a central island when used, and on the volume of the decorations placed in the tank. Water turnover rates in conventional vortex (vertical wall) aquarium seldom exceeds one water change every six hours because of vortexing and high tank volume. However, with our dish type aquarium a complete water change once every hour is possible since discharge is accomplished over a large tank bottom area without induction of undesirable water currents. Thus, if the tank contains 300,000 gallons of water, a water supply (and discharge capacity) of about 5,000 gallons per minute is required for a turnover every hour. The advantages of the high water turnover rate, feasible only in the improved aquarium of our invention, include: (1) water clarity is kept at a maximum thus reducing the light scattering problem typical of high population aquariums; (2) particles from organic growth, feeding, animal waste, and the like are flushed out of the aquarium faster, thus creating a healthier aquatic environment for fish life; (3) a much larger bio-mass of fish and other organisms can be maintained in a given volume of water than with previously known display tanks such as conventional vortex aquariums; and (4) living bottom animals such as corals can be sustained in the aquarium.

Cross supports 24, 26, and ground level cross support 25 form circumferential horizontal platforms around the aquarium which provide walkways for observers who are looking into the aquarium top surface and through windows 28 and 30. Surrounding the inner periphery of upper cross support (walkway) 26 is protective railing 62, usually about 4 feet high, positioned to prevent observers from falling into the aquarium. Usually railing 62 is a large open mesh chain link style of fencing which permits observation through the openings for small children. Access stairways, rampways, and the like connecting one platform to another are conventional and are not shown. Support shell 22 and foundation support 20, as well as cross supports 24, 25, and 26, are usually made, as here, of reinforced concrete and integrally bonded to sloped tank wall 10.

Window ledges 40 and 43 comprise continuous ledges, each formed at one horizontal level around sloped wall 10. The slight projection of window ledges 40 and 43 into the tank space inwardly from sloped wall 10 creates vertical sections 41 and 45 below window ledges 40 and 43, respectively. Windows 28 and 30 are located in vertical sections 41 and 45, respectively, for observation of the tank interior. Ledges 40 and 43 can also be positioned so as to spiral around the tank interior, thus creating a spiral observation window pattern, and consequently requiring spiral platforms for observers. A spiral window pattern advantageously permits every window to display a different depth of marine environment.

In a 70 foot top diameter aquarium of our invention which is 22 feet high and has 45 degree sloped walls, the windows typically are about 5 feet high and about 3 feet wide. However, any size of window is satisfactory and depends primarily on viewing requirement, aquarium size, and architectural design. Preferably, windows 28 and 30 are as tall as possible and are continuous around each level of tank, separated only by support sections of sloped wall 10. A tall window 28 or 30 allows both children and adults, simultaneously or individually, to look through the window without viewing interference. Windows 28 and 30 can be made of any transparent material, but usually are either tempered plate glass or laminated plate glass of appropriate thickness to withstand tank pressures. The tank window frame is usually constructed of a metal such as a type 316 stainless steel, but can be made of any corrosion resistant structural material. Care should be taken to not use dissimilar metals in any of the aquarium construction because of electrolytic corrosion. Thus, the window frame metal, preferably, is the same metal as found exposed elsewhere in the aquarium. The edges of the glass of windows 28 and 30 is set into a sealing gasket in the conventional manner. The preferred gasket material is made from a solid sheet of neoprene in order to avoid seams which are conducive to leaks. However, any deformable gasketing material which is suitable for use in aquatic marine environments can be used.

Decorative center island 44 juts above the water surface and houses a center scum collector 46, which is molded as a gutter in the top of center island 44 to skim the center surface water from the aquarium. The water flowing in center scum collector 46 drains into conical collecting basin 16 and thus into tank discharge 18 via center drain line 48. The circular shape of this embodiment of our aquarium and the water flow pattern therein lends itself to the illustrated center scum drain feature which keeps the center surface area of the aquarium free of floating residues. A further scum clearing device is peripheral scum gutter 50 which completely surrounds the rim of the aquarium, thus eliminating any floating wastes and slimes from the peripheral water surface areas. Peripheral scum drain line 52 conveys the scum and accompanying water into conical collector 16 and thus into the flow stream of tank discharge line 18. Either or both of these surface cleaning devices, central scum collector 46 or scum gutter 50, can serve as an overflow for the aquarium. The presence of center island 44 is particularly advantageous to our aquarium display in that cross-tank vision is partially obstructed thus improving the illusion that the observer is on the ocean bottom. Center island 44 is preferably formed with openings for the fish to swim through. The exposed top portion of center island 44 serves as a water aeration surface by passing a portion of the water supplied to the aquarium up through center island 44 via water pipe 60 and allowing the water to splash onto the top of center island 44.

Top support shell 32, completely surrounding the deck of top cross support 26, is integrally connected to support shell 22, and is thus an extension thereof. Tank cover 34, comprising removable partitions or panels, rests on support shell 32 whose extremity thus provides a support ring for tank cover 34. Tank cover 34 not only permits control of intense insolation where required, but available light can be decreased sufficiently to check the growth of algae in the aquarium. In addition, reducing the light striking the water by covering the tank with tank cover 34 minimizes light scattering problems from fine particles in the water, i.e., Tyndall effect. Even with considerable reductions in the intensity of light allowed to enter the aquarium, visibility is high since the human eye is extremely sensitive and accommodates easily to very low light levels. Tank cover 34 can be made of metal, plastic, wood, or other suitable covering materials. Preferably the panels of tank cover 34 are constructed of an opaque plastic sheet material, or a thin metal sheet such as an aluminum foil.

Located above the center of the aquarium is central light fixture 36 attached to the dome formed by the panels of tank cover 34. Central light fixture 36 is particularly preferred as it is suspended in the center of the aquarium away from the observers, but other locations are suitable and can be used. Conventional spotlights 38, mounted in central light fixture 36, can be directed to particular sections of the aquarium for special lighting effects and display attention. Underwater lighting, as is conventional in aquaria, is also used throughout the tank but is not illustrated.

A particular feature of the dish tank aquarium of our invention is that the bottom (demersal) fish are drawn up the inclined sides of the tank and are easily visible from all of the windows. Particularly, these bottom species inhabit window frame ledges 40 and 43 to provide demersal species display throughout the tank. At the same time, sloped wall 10 tends to hold the pelagic species in the deeper center water where there is little danger of collision with the aquarium walls, thus overcoming the problem found with vertical walled vortex tanks where pelagic fish species tend to hit the tank walls and injure themselves.

Another feature of our aquarium or dish tank is the complete flexibility of shape and design. While vortex tanks are limited to shapes in which full flow circular flow patterns can be induced, the dish tanks of this invention can assume almost any shape since substantially all of the tank bottom acts as a drain which induces flow from all parts of the tank. For example, our aquarium can be oval, square, rectangular, or donut shaped. However, for simplicity of construction, economy, and viewing efficacy, a circular style tank as illustrated in the drawings is preferred.

Various other changes and modifications are apparent from the description of this invention and further modifications and changes are intended to be included within the scope of this invention as defined by the following claims.

We claim:
1. In combination with a body of water containing a multiplicity of aquatic animals including pelagic fish, an aquarium retaining said body of water which comprises:
  level porous bottom means for removing water and wastes from and retaining said aquatic animals in said body of water;
  water and waste removal means communicating with said bottom means to permit removal of water and wastes throughout substantially the entire area of said bottom;
  inclined wall means connected to the periphery of said bottom means, said wall means sloping upwardly and outwardly from said bottom means to form said aquarium having a bowl-shaped interior and an exterior with side walls having sufficient inclination from the horizontal to permit said pelagic fish to avoid collision thereagainst;
  window means located in said wall means for permitting the observation of said aquatic animals from said exterior of said aquarium; and
  water introduction means located in said wall means and opening into said interior of said aquarium for adding water to said body of water, said water introduction means and said water and waste removal means being operative to pass water through said aquarium without the creation of a vortical movement to said body of water.

2. A water-filled aquarium assembly for the display of aquatic animals which comprises:
  an aquarium having a substantially horizontal porous bottom and having side walls sloping upwardly and outwardly at an angle inclined to the horizontal of less than about 55 degrees from said porous bottom to form a bowl-shaped container;
  at least one water inlet conduit opening into said aquarium through said side walls for maintaining said aquarium filled with water;
  at lease one transparent observation window in said sloping walls; and water discharge means located beneath said porous bottom for collecting and removing water and waste downwardly throughout substantially the entire area of said porous bottom.

3. An aquarium as described in claim 2 wherein said sloping side walls of said aquarium are covered with a decorative irregularly surfaced concrete coating.

4. An aquarium as defined in claim 2 including rim gutter means at least partially surrounding the upper edge of said aquarium for the removal of peripheral surface water containing waste materials, said rim gutter means being located so that water from said aquarium can overflow thereinto.

5. An aquarium as described in claim 2 wherein said sloped walls are inclined from the horizontal at an angle between about 35 degrees and about 55 degrees.

6. An aquarium as described in claim 2 wherein said water inlet conduit terminates within said aquarium with a directionally adjustable water nozzle attached thereto by a flexible joint.

7. An aquarium as described in claim 6 wherein there is a multiplicity of said water inlet conduits, the majority of said water inlet conduits being adjustable so as to discharge their water stream downwardly toward said porous bottom.

8. An aquarium as defined in claim 2 including decorative island means projecting upward vertically from said porous bottom to the surface of the water filling said aquarium for reducing cross-aquarium vision, thereby serving as a visual baffle for observers located on the exterior of said bowl and looking through said observation window.

9. An aquarium as defined in claim 8 including central gutter means located on at least a part of the periphery of said decorative island for the removal of central surface water containing waste materials, said central gutter means being vertically positioned on said island so that central surface water can overflow thereinto.

10. An aquarium as described in claim 2 including observation platform means located adjacent the exterior of said aquarium and projecting outwardly from said observation window so as to permit observers convenient visual access to said observation window.

11. An aquarium as described in claim 10 wherein there are a multiplicity of said observation windows located in at least one horizontal row around said side walls of said aquarium.

12. An aquarium as described in claim 2 wherein said porous bottom has an area equal to at least about 4 percent of the area of the top water surface of said aquarium.

13. An aquarium as described in claim 12 wherein said porous bottom has an area between about 15 percent and about 30 percent of the top water surface of said aquarium.

14. An aquarium as described in claim 2 which includes ceiling means mounted above said aquarium for at least partially covering the water surface of said aquarium, for reducing insolation, and for reducing light diffraction on the water surface of said aquarium.

15. An aquarium as described in claim 14 wherein said ceiling means comprises a multiplicity of removable arcuate panels forming a generally hemispherical dome above said aquarium.

16. An aquarium as described in claim 14 including illumination means mounted centrally above said aquarium, said illumination means having at least one flood light directed towards the water surface of said aquarium.

17. An aquarium as described in claim 2 wherein said substantially horizontal porous bottom has openings therein which are sufficiently large to permit refuse, excess food, and aquatic animal excrement to pass, said openings being sufficiently small to retain said aquatic animals within said aquarium.

18. An aquarium as described in claim 17 wherein said porous bottom comprises:
- a foraminous support plate attached to said side walls;
- an open-mesh screen covering the top of said foraminous support plate; and
- a bed of relatively uniform diameter aggregate disposed in a substantially even layer on top of said open-mesh screen.

19. An aquarium as described in claim 18 wherein said aggregate has a mean diameter between about ⅛ inch and about 1 inch.

20. An aquarium filled with water which comprises:
- a bowl-shaped vessel having an open top, a horizontal porous bottom having an area greater than about 10 percent of the area of said open top of said bowl-shaped vessel, and inclined walls sloping upwardly and outwardly from the periphery of said porous bottom at an angle of about 45 degrees from the horizontal;
- at least one transparent window in said inclined walls;
- an even layer of substantially uniform diameter aggregate resting on top of said porous bottom, said aggregate having a mean diameter greater than about 1⁄16 inch, said layer of aggregate and said porous bottom permitting water containing refuse, excess food, and aquatic animal excrement to flow from said vessel but retaining aquatic animals within said vessel;
- water and waste removal means communicating with said bottom to permit removal of water and wastes throughout substantially the entire area of said bottom;
- a multiplicity of water inlet conduits opening into said vessel through said walls for keeping said vessel filled with water, said water inlet conduits and said water and waste removal means being operative to pass water through said aquarium without the creation of a vortical movement to said water contained therein; and
- rim gutter means substantially surrounding said top of said vessel for the removal of peripheral surface water, said gutter means being located so that water from said aquarium overflows thereinto.

References Cited by the Examiner

UNITED STATES PATENTS

| | | | |
|---|---|---|---|
| 1,860,698 | 5/32 | Venditi | 119—5 |
| 2,494,937 | 1/50 | Gandy | 119—5 |
| 2,871,820 | 2/59 | Hayden | 119—5 |
| 3,091,220 | 5/63 | Willinger et al. | 119—5 |

OTHER REFERENCES

Miami Seaquarium, Miami, Florida, Sept. 24, 1955 (photo letter).

T. GRAHAM CRAVER, *Primary Examiner.*

ANTONIO F. GUIDA, CARL W. ROBINSON, *Examiners.*